United States Patent [19]

Edwards

[11] 3,818,076

[45] June 18, 1974

[54] BISDIGUANIDE SALTS

[75] Inventor: Philip Neil Edwards, Macclesfield, England

[73] Assignee: Imperial Chemical Industries Limited, London, England

[22] Filed: May 22, 1972

[21] Appl. No.: 255,670

[30] Foreign Application Priority Data
June 21, 1971 Great Britain.................... 28960/71
July 6, 1971 Great Britain.................... 31660/71

[52] U.S. Cl............................ 260/501.11, 424/319
[51] Int. Cl.......................................... C07c 101/22
[58] Field of Search.................. 260/501.11, 501.14

[56] References Cited
UNITED STATES PATENTS
2,990,425  6/1961  Senior......................... 260/501.14
3,152,181  10/1964  Shapiro et al............. 260/501.14 X Primary Examiner—Leon Zitver
Assistant Examiner—Michael W. Glynn
Attorney, Agent, or Firm—Cushman, Darby & Cushman

[57] ABSTRACT

Novel crystalline, non-hygroscopic salts of chlorhexidine having substantial water solubility and the ability to dissolve rapidly even in very cold water to give a solution of chlorhexidine suitable for use as an antiseptic or disinfectant.

2 Claims, No Drawings

BISDIGUANIDE SALTS

This invention relates to novel salts of the disinfectant compound chlorhexidine [1,6-di(4-chlorophenyldiguanido)hexane] which possess advantageous properties in comparison with previously known salts of chlorhexidine.

For certain applications, the presently known salts of chlorhexidine are not ideally suited. Thus, when chlorhexidine is to be used for antiseptic or disinfectant purposes, it is preferable to use chlorhexidine or a salt thereof in the form of an aqueous solution. It would be convenient and advantageous to be able to prepare such an aqueous solution as required, by dissolving a chlorhexidine salt, possibly in the form of a powder or tablet, in water. For use in such manner, it is important not only that the chlorhexidine salt selected is sufficiently soluble in water to give a solution of the required user strength, but also that the salt dissolves rapidly, even in very cold water.

Known salts of chlorhexidine do not meet these criteria. Most of the known salts are relatively insoluble in water, so that it is not possible with these salts to make a solution of 1% strength, such as is required for certain uses. Of known salts, only the gluconate salt is sufficiently soluble in cold water, but it is not practicable to supply this salt in a solid form for dissolution in water as required, as it is amorphous and hygroscopic, and cakes to a solid mass on exposure to a humid atmosphere. The gluconate is customarily supplied as an aqueous concentrate, but in this form it is of only limited stability to storage, and to heat or gamma-irradiation sterilisation, and is, of course, very much more bulky and heavy than the equivalent amount of chlorhexidine in solid form. In addition, it can be advantageous in the manufacture of chlorhexidine to purify the product by crystallisation of a suitable salt, and this is not possible with the gluconate.

There is thus a need, which is not met by any of the previously known salts of chlorhexidine, for a crystalline, non-hygroscopic salt having substantial water-solubility, and the ability to dissolve rapidly even in very cold water.

Thus, according to the invention there are provided the salts of chlorhexidine with glutamic acid, succinamic acid, iminodiacetic acid and 6-acetamidohexanoic acid.

Preferred salts contain two equivalents of acid per one equivalent of chlorhexidine, and a preferred glutamic acid is L-glutamic acid.

According to a further feature of the invention there is provided a process for the manufacture of the novel chlorhexidine salts of the invention which comprises the interaction of chlorhexidine or a salt thereof with glutamic acid, succinamic acid, iminodiacetic acid or 6-acetamidohexanoic acid or a salt thereof in a suitable solvent.

Suitable solvents are, for example, water, methanol, or mixtures of water or methanol with lower alcohols or other inert, water-miscible solvents.

The process may take the form of a simple displacement reaction, wherein either chlorhexidine is interacted with the reactant acid or a salt thereof with a weak base, for example, a salt with pyridine or aniline; or a salt of chlorhexidine with a weak acid, for example, with carbonic acid, is reacted with the reactant acid; or it may take the form of a metathetical reaction wherein a salt of chlorhexidine, for example, the carbonate, hydrochloride, sulphate or other salt, is reacted with such a salt, for example, the sodium, potassium or ammonium salt of the reactant acid, that the unrequired product from the metathetical reaction, for example sodium chloride, potassium sulphate etc., is insoluble in the solvent used.

The process may be carried out at ambient temperature, or at an elevated temperature, for example, at the boiling point of the solvent used.

According to a further feature of the invention there is provided a composition comprising a novel chlorhexidine salt of the invention together with an inert diluent or carrier.

Such a composition may be, for example, a tablet or a powder which may be added in measured amount to water to provide a solution containing an antibacterially effective amount of chlorhexidine, or the composition may be in the form of a concentrate for dilution with water to give a solution of chlorhexidine suitable for use as an antiseptic or disinfectant.

The invention is illustrated, but not limited by the following example:

EXAMPLE

Chlorhexidine (5.05 g.) was added to a stirred mixture of L-glutamic acid (2.94 g.) and distilled water (10 ml.) at room temperature (22°C.). The base rapidly went into solution, but stirring for 1 hour was necessary to complete the dissolution of the acid. Isopropanol (20 ml.) was added, and the mixture was seeded (8 mg. of finely ground product) and stirred for 3 hours until a thick slurry was formed. A further addition of isopropanol (40 ml.) followed by stirring the mixture for a further ½ hour gave a pourable slurry which was filtered. The solid was washed with isopropanol (10 ml.), warm-air dried, yielding the dihydrate, m.p. about 130°–140°C. (slow collapse to a very viscous liquid). The dihydrate, was crystallised twice from aqueous isopropanol to give chlorhexidine di-L-glutamate, m.p. 190°–191°C. with vigorous foaming, (exhaustive drying in vacuo at 120°C. raises m.p. to 220°C.).

In a similar manner, but using the appropriate acid in place of L-glutamic acid, there were obtained chlorhexidine disuccinamate (air-dried at 80°C.), m.p. 176°–179°C. and chlorhexidine di(iminodiacetate) (air-dried at room temperature), m.p. 220°–223°C.

In a similar manner, but using 6-acetamidohexanoic acid, and t-butanol in place of isopropanol, there was obtained chlorhexidine di(6-acetamidohexanoate) (air-dried at room temperature), m.p. 96°–98°C.

What we claim is:

1. A member of the group consisting of chlorhexidine di-L-glutamate, chlorhexidine disuccinamate, chlorhexidine di(iminodiacetate) and chlorhexidine di(6-acetamidohexanoate).

2. A salt according to claim 1, said salt being chlorhexidine di-L-glutamate.

* * * * *